O. H. KRAUSE.
APPARATUS FOR LIQUORING HARD SUGAR IN CENTRIFUGAL MACHINES.

No. 191,535. Patented June 5, 1877.

UNITED STATES PATENT OFFICE.

OTTO H. KRAUSE, OF JERSEY CITY, N. J., ASSIGNOR TO F. O. MATTHIESSEN & WIECHERS SUGAR REFINING COMPANY, OF SAME PLACE.

IMPROVEMENT IN APPARATUS FOR LIQUORING HARD SUGAR IN CENTRIFUGAL MACHINES.

Specification forming part of Letters Patent No. 191,535, dated June 5, 1877; application filed April 21, 1877.

*To all whom it may concern:*

Be it known that I, OTTO H. KRAUSE, of Jersey City, New Jersey, have invented certain Improvements in Apparatus for Liquoring Hard Sugar in Centrifugal Machines, of which the following is a specification:

The object of my invention is to effect an equal distribution of the white liquor used to liquor hard sugar in the centrifugal machine, and thus insure the production of a uniform effect upon all parts of the sugar contained in the molds.

My invention consists in filling a part of the central portion of the basket of the centrifugal machine, opposite the open inner faces of the sugar-molds, with an absorbent material which can be saturated with white liquor. This material may be sponge, cotton, or wool, or any material capable of holding the white liquor in suspension by capillary attraction until acted upon by the centrifugal forces generated by the rapid motion of the basket, which, by their greater energy, force the white liquor radially outward into and through the hard sugar contained in the molds.

The object in liquoring hard sugar is to drive out the entire quantity of green sirup it contains, and to substitute, in the place of the green sirup, a prescribed quantity of white liquor.

My invention enables me to hold and present in the most favorable position for uniform injection into the hard sugar the exact quantity of white liquor which may be required.

Figure 1:
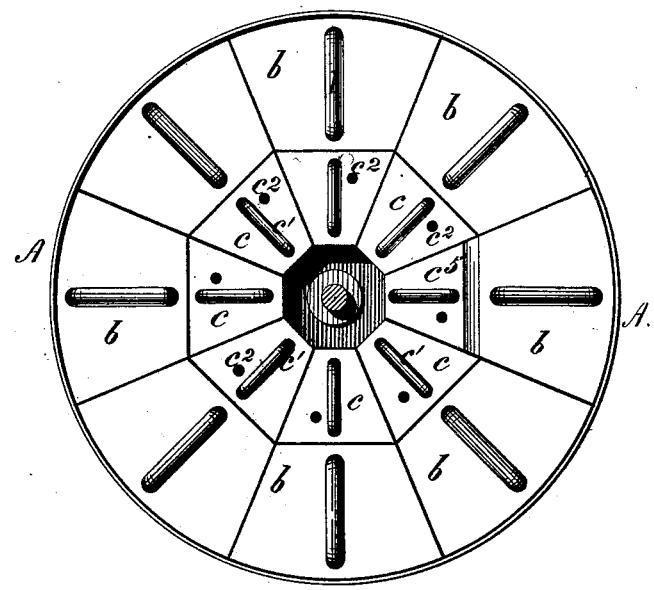
Figure 2:
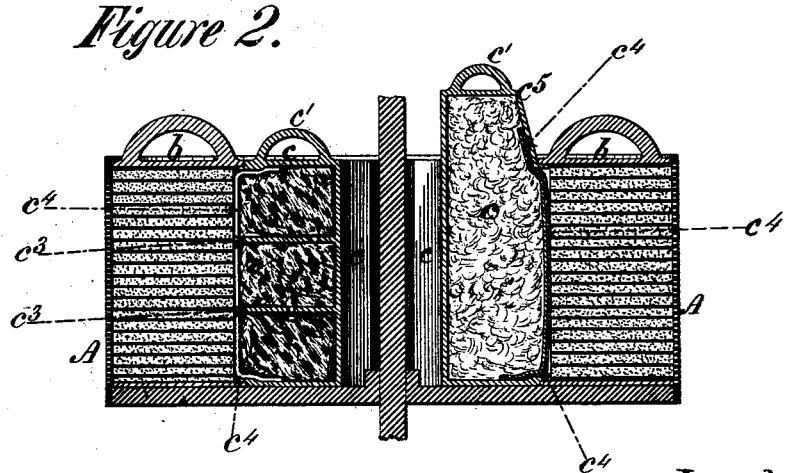

The accompanying drawings, illustrating my improved apparatus in connection with a perforated basket of a centrifugal machine, are as follows:

Figure 1 is a top view of the basket. Fig. 2 is a central longitudinal section through the basket and shaft of a centrifugal machine.

The drawings exhibit the ordinary perforated basket A of a centrifugal machine, containing a series of hard-sugar molds, $b\ b\ b$, &c., of the usual form. These molds are of such dimensions that their flaring sides meet in radial planes when all the molds are placed in the basket. The sugar-molds are open on the inner side to expose the sugar they contain to the action of the white liquor.

Instead of filling the entire interior space in the basket with sponge, I find it preferable to place my absorbent material in the inner series of molds $c$, which, for convenience, I call "sponge-molds." The upper ends of the sponge-molds are provided with the handles $c^1$, by means of which they may be lifted from or placed in the basket. Each sponge-mold is provided with an opening, $c^2$, in the top, through which white liquor may be poured in upon the absorbent material which it contains without removing the mold from the basket.

It may be desirable, in some cases, to provide the sponge-molds with one or more transverse partitions, $c^3$, to prevent any settling of the white liquor in the lower portion of the sponge-mold, which might be caused by the weight of the material in the upper portion. I also provide the sponge-molds with screens $c^4$, composed of one or more thicknesses of cotton cloth, or other porous material, stretched along the sides, next to the sugar-molds, to prevent the too free discharge of the white liquor from the sponge-molds when the machine is set in motion.

To insure an adequate supply of white liquor contained in the upper part of the sugar-molds, I may construct the sponge-mold with the prolongation $c^5$, which, it will be seen, forms a chamber which is closed, except at the bottom, and serves to carry a portion of the absorbent material in a plane higher than the tops of the sugar-molds.

In operating my apparatus the sponge or other absorbent material is saturated with white liquor, and the sugar-molds and sponge-molds are then placed in the basket in the position shown in Fig. 1. The machine is then rotated, and the centrifugal force thus generated drives the white liquor from the absorbent material in the sponge-molds through the screens into the sugar contained in the molds, through which it passes radially, driving the green sirup before it, and taking the place of the green sirup in the sugar. As the white liquor is held in suspension by capillary attraction, and is acted upon laterally by centrifugal force, it is in favorable position for equal diffusion through all portions of the sugar, from the top to the bottom of the molds.

If desired, the machine can be stopped and the sponge-molds be recharged with white liquor without removing them from the basket.

The sponge-molds may be made to fit two or more of the sugar-molds, if preferred. The absorbent material may be omitted from the sponge-molds if they are provided with screens of sufficient thickness to properly delay the expulsion of the white liquor.

I claim as my invention, as and for the purposes described, in a centrifugal machine provided with molds for containing hard sugar—

1. The combination of the sugar-molds $b$ with the movable molds $c$, for containing an absorbent material.

2. The molds $c$, provided with one or more transverse partitions, $c^3$.

3. The molds $c$, constructed with the vertical prolongation $c^5$.

O. H. KRAUSE.

Witnesses:
M. L. ADAMS,
EDWD. PAYSON.